United States Patent
Aebi et al.

(10) Patent No.: US 6,909,057 B2
(45) Date of Patent: Jun. 21, 2005

(54) BALANCE WITH DRAFT SHIELD

(75) Inventors: Christoph Aebi, Neuenburg (CH); Paul Lüchinger, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 251 days.

(21) Appl. No.: 10/406,819

(22) Filed: Apr. 4, 2003

(65) Prior Publication Data

US 2003/0188898 A1 Oct. 9, 2003

(30) Foreign Application Priority Data

Apr. 4, 2002 (DE) .......................................... 102 14 954

(51) Int. Cl.⁷ .............................................. G01G 21/28
(52) U.S. Cl. ....................... 177/180; 177/238; 16/111.1; 312/244; 312/257.1
(58) Field of Search ................................ 177/180, 181, 177/238–244; 16/111.1; 312/244, 257.1

(56) References Cited

U.S. PATENT DOCUMENTS 4,700,793 A * 10/1987 Luchinger .................. 177/181
5,874,694 A * 2/1999 Ruedisueli ................. 177/180
6,686,545 B2 * 2/2004 Luchinger et al. .......... 177/180

FOREIGN PATENT DOCUMENTS

EP  0234008  9/1987

* cited by examiner

Primary Examiner—Randy W. Gibson
(74) Attorney, Agent, or Firm—Friedrich Kueffner

(57) ABSTRACT

A balance with a draft shield enclosing a weighing pan (33) has slidable walls (6, 7, 8) with slide handles (10, 110, 210) to open and close the weighing compartment (2). A connector body (22) serves to couple non-adjoining slidable walls (6, 7, 8) to each other. Besides for pushing the slidable walls open and closed, the slide handles (10, 110, 210) also serve to couple and uncouple the slidable walls, so that more than one wall can be moved simultaneously using only one hand, or a wall can be moved by pushing a handle on the opposite side. The slide handles are configured as pairs of handle elements that are attached either to adjoining walls or to a wall and an adjoining place on the connector body. In the coupled state, the pairs of handle elements are folded or swiveled into each other, working as a single handle, e.g., for two adjoining walls. In the uncoupled state, they move the walls individually.

11 Claims, 5 Drawing Sheets

BALANCE WITH DRAFT SHIELD

BACKGROUND OF THE INVENTION

The invention relates to a balance, in particular a precision balance or an analytical balance with a weighing pan enclosed in a weighing compartment, wherein the weighing compartment is delimited by a draft shield in which at least two walls are slidable to open and close the weighing compartment, and wherein the slidable walls are coupled to each other to allow a simultaneous opening and closing of both walls.

Balances of this type belong to the familiar state of the art and are used primarily in laboratories, e.g., for dispensing substances by weight when performing chemical analyses.

The European patent application EP 0 234 008 A2 discloses a balance of this type, wherein the draft shield has a fixed glass window at the front, rearwards-slidable doors at the sides, and a rearwards-slidable cover panel on top. The two lateral sliding doors can be connected to each other by way of a plate that is slidably arranged underneath the balance. Latches that are preferably configured as bolts engaging a recess by sliding back and forth are integrated in the door handles and allow the sliding doors and the cover panel to be coupled to each other as needed. By means of the plate connecting the door handles that are fastened at the bottom of each of the two sliding doors, it is possible to move both doors simultaneously as well as move either one of the doors by pushing the handle on the opposite side.

The concept of moving sliding windows together as well as opening and closing a lateral sliding window through actuation from the opposite side is also shown for the balance disclosed in EP 0 547 298 A1, where each of the two lateral sliding windows preferably consists of two panels set at an obtuse angle to each other, which requires that the windows slide in curved guide tracks. The mechanism which is arranged at the underside of the balance for moving the two lateral sliding windows therefore has two flat actuation levers protruding on both sides of the housing, which are pivoted on the floor of the housing so that they can be swiveled back and forth, and which are connected by a flat coupling element in the form of a slidable plate that is likewise arranged on the floor of the housing. The lateral sliding windows are in this case coupled to the slidable plate either through a vertically movable bolt or through a small latch arranged in the lower part of the two-part handle and engaging a recess in the upper part of the handle.

In both types of balances of the foregoing description, the connecting- or coupling element, in particular the bolt or latch, is substantially hidden inside the handle. A person standing several meters away from the balance, e.g., when entering the laboratory, will therefore not be able to tell which of the different operating positions the balance is currently set for with regard to the coupling of the sliding windows to each other and/or to the sliding mechanism or the connecting plate.

OBJECT OF THE INVENTION

It is therefore the object of the present invention to propose a balance whose operating position in respect to the opening and closing function of the sliding windows is conspicuously evident even when looking at the balance only casually and/or from a larger distance.

SUMMARY OF THE INVENTION

In accordance with the invention, a balance, in particular a precision balance or an analytical balance, has a weighing pan enclosed in a weighing compartment. The weighing compartment is delimited by a draft shield in which at least two walls are slidable to open and close the weighing compartment. A slidable connector body serves to couple slidable walls that are not adjoining each other. The balance is equipped with slide handles that are configured for coupling and uncoupling either the connection of the slidable walls to each other, or the connection of one of the slidable walls to the connector body. A slide handle of the foregoing configuration is constituted by two handle elements that complement each other as a pair and are connected either to adjoining slidable walls, or to the connector body and a movable wall adjoining the connector body, where each of the handle elements by itself is configured as a handle to slide the individual wall or the connector body that the handle element is attached to. In each pair of handle elements, a first handle element is configured with a recess, and a second element is configured to engage the recess through a swiveling movement of the first and/or the second handle element in order to couple the pair of handle elements together. A pair of elements in their coupled condition has substantially the same outward contour and size as the first handle element with the recess.

This arrangement, where the function of a handle for manually moving a wall is combined with the function of coupling slidable walls to each other, has the particular advantage that the coupled state and the uncoupled state are conspicuously different so that a user of the inventive balance will be able to recognize immediately which handle or handle element to use, e.g., to open the balance for placing a weighing sample on the weighing pan. A balance with handle elements that can be combined into a slide handle, where each element by itself can also be used as a handle to slide one of the walls, is also particularly advantageous from an ergonomics-oriented perspective.

In a preferred embodiment, the second handle element as well as the recess where the second handle element is received in the first handle element are configured to produce a self-centering effect when the second handle element is folded into the first handle element. It is therefore not necessary to exactly align the two handle elements vertically above one another in order to swivel them together into a single combined slide handle. This facilitates the work flow.

A slide handle as well as the handle elements that fit together as a slide handle are configured substantially resembling oblong discs, particularly wing-shaped discs, wherein at least one of the handle elements can be swiveled about an axis that traverses the handle element at an off-center point of the handling element. In a further developed version of the invention, the outward-facing surfaces of the handle elements have ergonomically shaped shallow concavities to give the user a secure grip on the handle elements.

A swiveling handle element is preferably designed so that it snaps into two stable detent positions, one of which represents the coupled state where the pair of handle elements are combined into the slide handle. The swiveling handle element is firmly retained in the currently selected position by means of a spring.

In a particularly advantageous embodiment, the balance has guide elements for sliding the walls, where a handle element associated with the wall is arranged at one of the guide elements. In particular the swiveling handle element is attached through its swivel axle (rotatable about the latter) to a slidable wall, more particularly to a guide device that is connected to the slidable wall, and/or the swiveling handle element is attached through its swivel axle to the connector body.

BRIEF DESCRIPTION OF THE DRAWINGS

The invention is set forth below through an exemplary embodiment of a balance according to the invention as well as different embodiments of an inventive slide handle, as shown in schematically idealized and/or simplified drawings, wherein.

DESCRIPTION OF PREFERRED EMBODIMENTS

Figure 1:
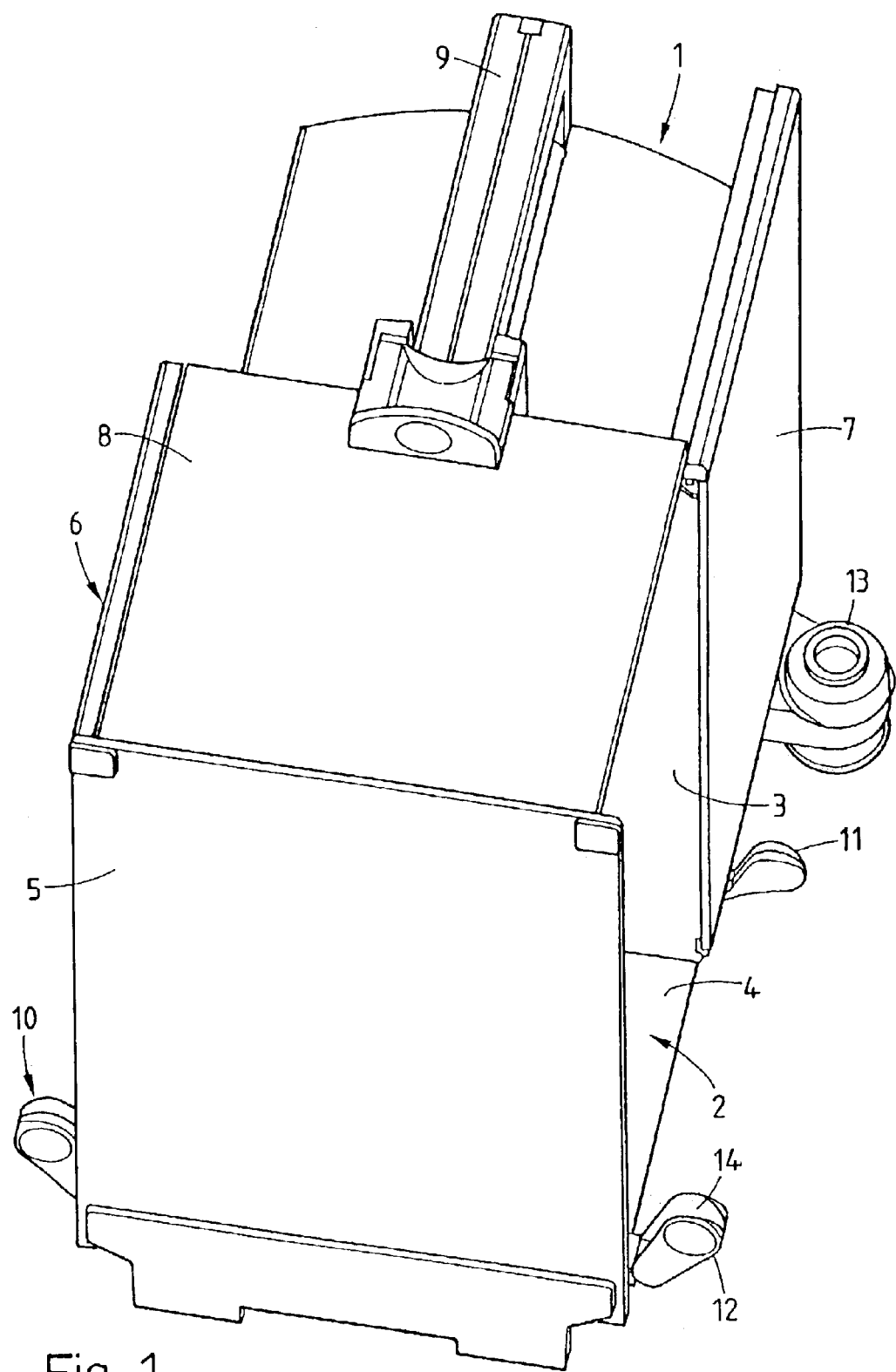
FIG. 1 represents a balance in a three-dimensional view without display- and operator-input unit.

FIG. 1 illustrates a balance of the type that is used for example in laboratories as an analytical balance. The balance has a balance housing 1 that is occupied primarily by the weighing mechanism and the weighing electronics, and it further has a weighing compartment 2 surrounding a weighing pan that is not visible in this drawing (shown in FIG. 2). The rear wall 3 and the floor 4 of the weighing compartment 2 constitute the spatially fixed part of the balance. The weighing compartment 2 is further delimited by a front wall 5, two side walls 6, 7, and a top cover panel 8. The two side walls 6, 7 and the top cover panel 8 (also collectively referred to as sliding walls 6, 7, 8) can be slid to the rear along the balance housing to open up and close off the weighing compartment 2. The balance stands on three feet 13, only one of which is visible in the drawing.

A grip handle 9 is arranged on top of the balance housing 1. In addition to its function as a carrying handle, the grip handle 9 also serves as a guide track for opening and closing the top cover panel 8. The two side walls 6, 7 are fastened to a guide device (not shown in FIG. 1) and can be moved by means of a slide handle 10, for example rearwards along the balance housing 1 to open the weighing compartment 2. The slide handle 10 is composed of two handle elements 11, 12. One of the two handle elements, the handle element 11, is rigidly connected to its respective side wall 6, 7 and/or to the guide device, while a second handle element is arranged so that it can swivel in a plane that extends substantially perpendicular to the side walls 6, 7. Either of the handle elements 11, 12 by itself can also be used as a handle to move a side wall 6, 7, as shown in FIG. 1, where the side wall 7 is moved to the rear with the handle element 11. If the side wall 7 is positioned so that the rigidly connected handle element 11 is positioned vertically above the swiveling handle element 12, a swivel movement of the handle element 12 will bring the handle element 11 into engagement with the recess 14 of the handle element 12, so that the two handle elements are combined into a slide handle 10. The two handle elements 11, 12 are shaped so that the engagement is self-centering, as will subsequently be explained in detail in the context of FIG. 3.

In short, the two handle elements 11, 12 form a pair that can be combined through a swivel movement into one slide handle 10. The dimensions and outside contour shape of the slide handle 10 substantially correspond to the size and shape of the swiveling handle element 12.

Figure 2:
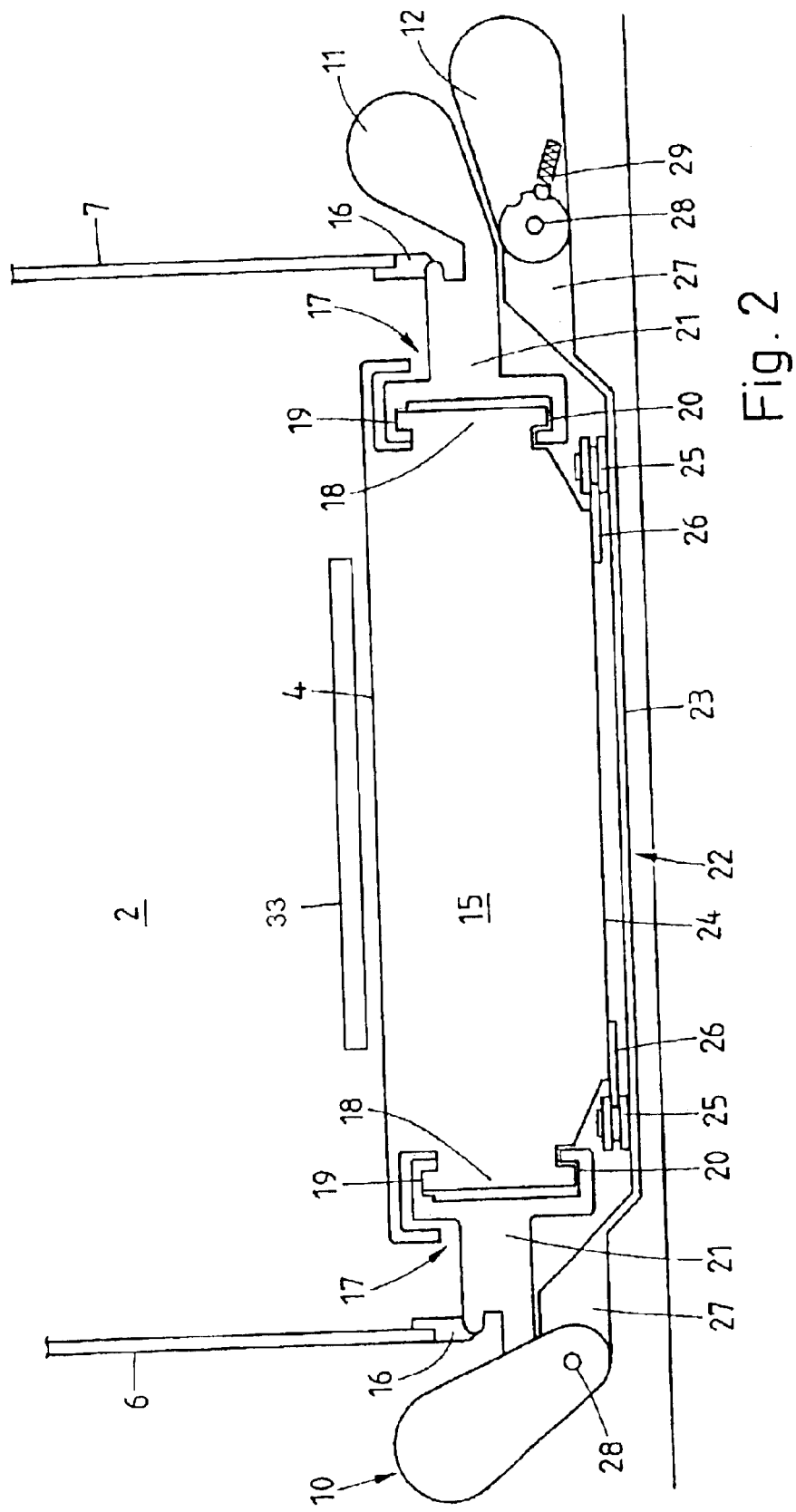
FIG. 2 represents a sectional view of the under-floor compartment of the balance as seen in a sectional plane parallel to the front wall panel.

FIG. 2 represents the lower portion of a balance that is set up in a working condition, as seen in a sectional view in a plane parallel to the front wall. The weighing compartment 2 surrounds a weighing pan 33, which preferably is connected to the weighing mechanism inside the balance housing 1 by a coupling arrangement at the rear wall 3 of the weighing compartment 2. A floor compartment 15 below the floor 4 of the weighing compartment 2 contains, e.g., a calibration device (not shown in FIG. 2). Each of the two side walls 6, 7 is attached to a guide device 17 by means of a holder element 16, preferably through a releasable connection. The guide device on each side has a guide rail 18 connected rigidly to the floor compartment 15 and extending preferably over the entire length (perpendicular to the sectional plane of the drawing) of the floor compartment. On each side of the balance, a carriage 21 has guide grooves 19, 20 embracing the top and bottom of the guide rail 18. When a side wall 6, 7 is moved, the associated carriage 21 glides along its guide rail 18. The outer end of each carriage 21 extends laterally beyond the weighing compartment 2 into a rigidly connected handle element 11 which can be grasped to manually move the side wall 7, as shown in FIG. 1, for opening and closing the weighing compartment 2. Thus, the carriage 21 and side wall 7, which are connected by the holder element 16, can be considered as a slidable wall unit. Of course, it is also possible to attach the rigid handle element 11 directly to the side wall 7 or to the holder element 16.

Arranged below the floor compartment 15 is a connector body 22 consisting of a plate 23 that extends below the housing floor 24 over the entire width of the floor compartment 15. The connector body 22 is movable along the floor compartment in a direction perpendicular to the sectional plane of the drawing by means of four rollers 25 (only two rollers being visible in the drawing) each of which is guided on a projection 26 that is fastened to the housing floor 24.

Connected to both sides of the plate 23 are holder devices 27 to which the swiveling handle elements 12 are fastened, protruding laterally from the weighing compartment 2. Each of the swiveling handle elements 12 is arranged in such a manner that it can embrace the rigid handle element 11 if the two handle elements 11 and 12 are positioned vertically above one another (as they are on the right-hand side of FIG. 2), so that the rigid handle element 11 is received in a recess 14 of the swiveling handle element 12, whereby the two handle elements are combined into a slide handle 10 (as shown on the left-hand side of FIG. 2).

If a rigid handle-element 11 and a swiveling handle element 12 are combined into a slide handle 10 (as shown on the left-hand side of FIG. 2), the guide device 17 of the corresponding side wall 6 is thereby coupled to the connector body 22, so that the left side wall 6 can be moved together with the connector body 22. According to the positions of the handle elements shown in the drawing, the left side wall 6 and connector body 22 can be moved either by means of the slide handle 10 on the left-hand side or by means of the handle element 12 on the right-hand side. This arrangement allows an operator of the balance to use one hand to move the wall on the opposite side of the balance in order to open and close the weighing compartment 2. To move both side walls 6, 7 simultaneously by pushing only one handle, the rigid handle element 11 and the swiveling handle element 12 on both sides are coupled together to form slide handles 10.

The swiveling handle element 12 is configured to snap into two stable positions, one of which represents the coupled condition of the pair of handle elements as a slide handle 10. The handle element 12 is firmly held in either of the stable positions by means of a spring 29.

Figure 3:
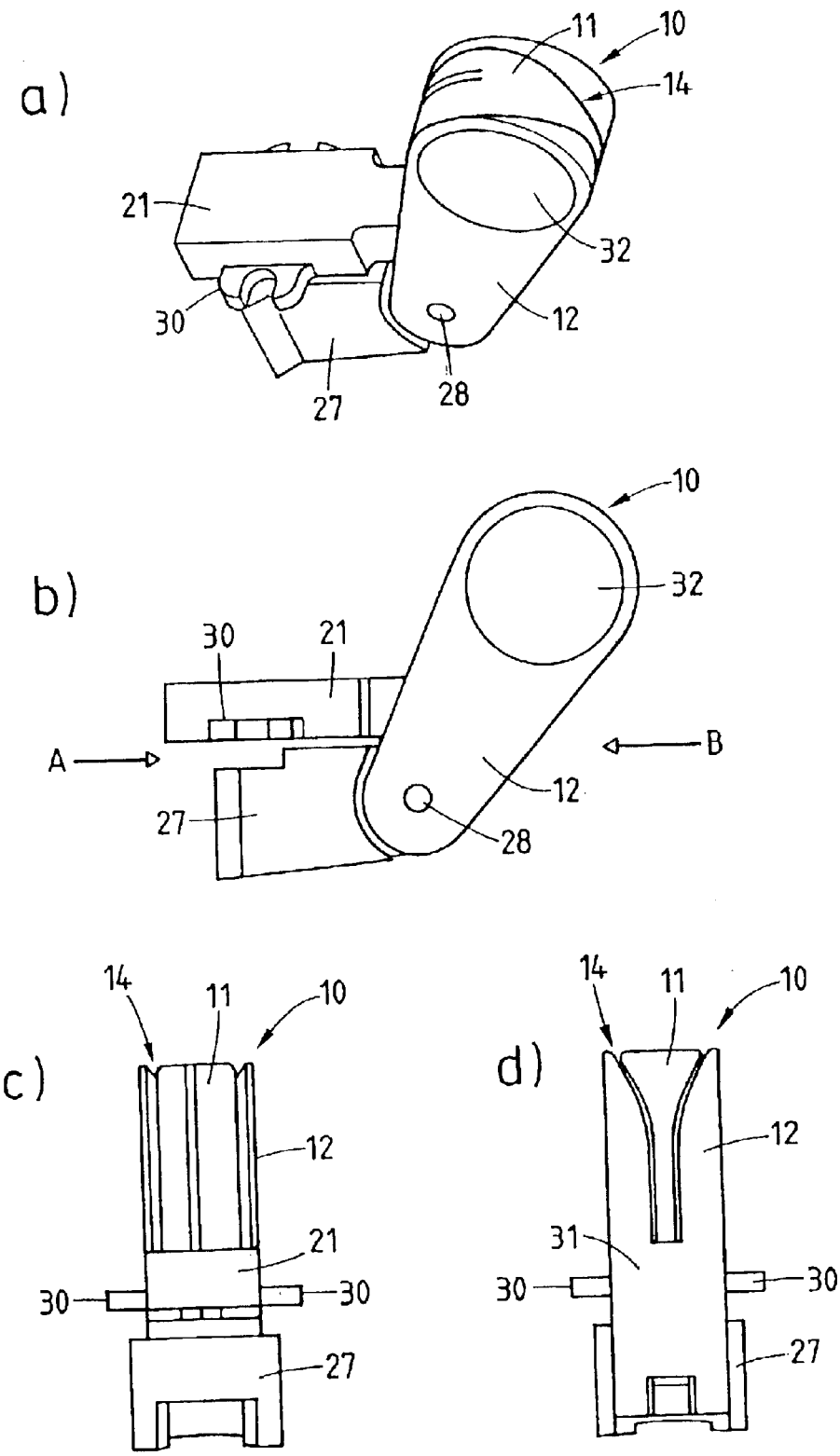
FIGS. 3a–d represent a first embodiment of a slide handle as seen from different viewing directions.
Figure 4:
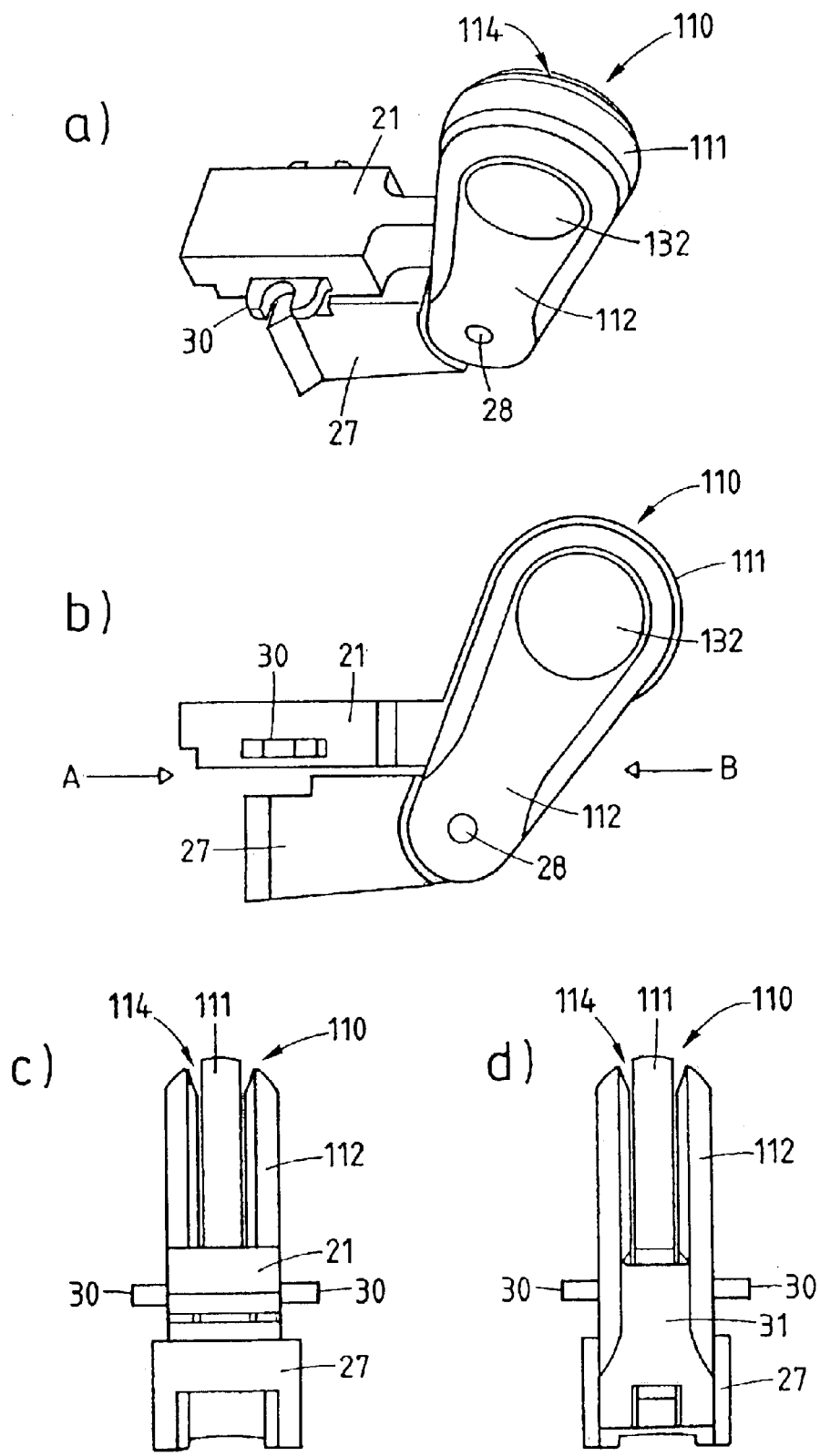
FIGS. 4a–d represent a second embodiment of a slide handle as seen from different viewing directions.
Figure 5:
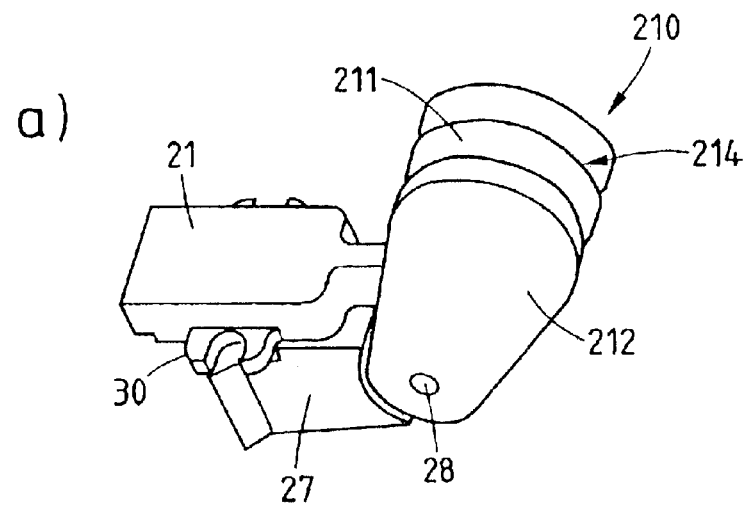
FIGS. 5a–d represent a third embodiment of a slide handle as seen from different viewing directions.
Figure 5:
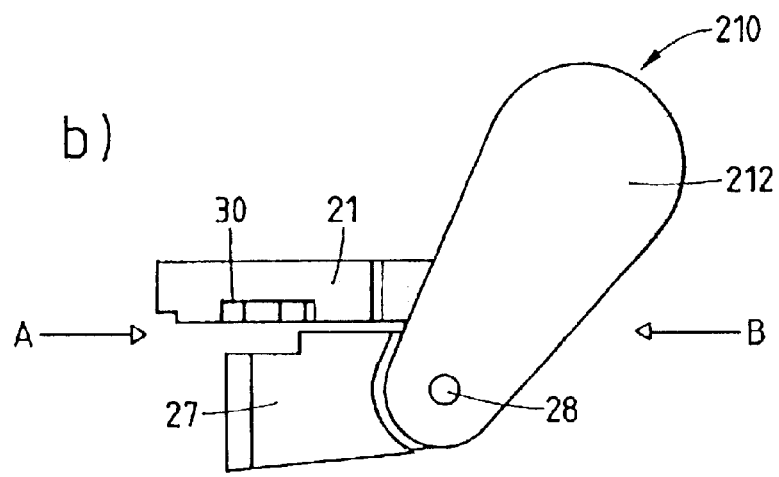
Figure 5:
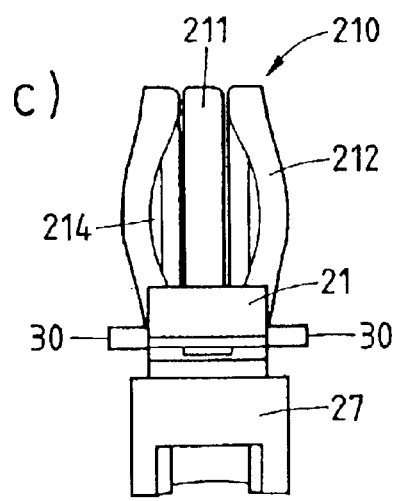
Figure 5:
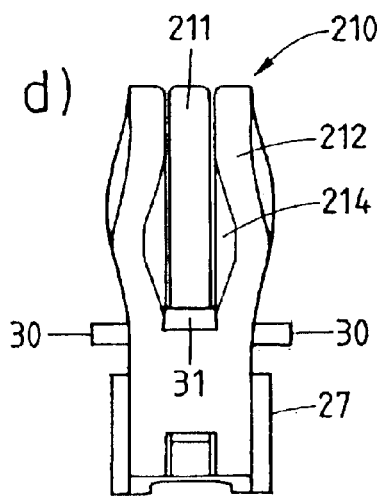

FIGS. 3 to 5 illustrate different embodiments of slide handles 10, 110, 210, each seen from different directions. FIGS. 3a, 4a and 5a each show an embodiment of a slide handle 10, 110, 210 in a three-dimensional view. FIGS. 3b, 4b and 5b show the respective handles in a side view, i.e., viewed in the same direction as in FIG. 2. The FIGS. 3c, 4c and 5c represent a view in the direction of the arrow A that is indicated in the FIGS. 3b, 4b and 5b. FIGS. 3d, 4d and 5d offer a view in the direction of the arrow B that is indicated in the FIGS. 3b, 4b and 5b. In all of the illustrated embodiments, the rigid handle element 11, 111, 211, is snapped into the recessed space 14, 114, 214 of the respective swiveling handle element 12, 112, 212, so that the carriage 21 of the guide device 17 of a side wall is coupled to the holder device 27 of the connector body 22. The fastening lugs 30 attached to the carriage 21 serve for the connection of the holder elements 16 for the side walls 6, 7.

All of the illustrated embodiments of a slide handle 10, 110, 210 have in common that the slide handle has the shape of an oblong disc, i.e., resembles a wing, and that at least one of the handle elements 12, 112, 212 can be swiveled about a swivel axle 28. The swivel axle 28, which connects a handle element 12, 112, 212 to the holder device 27, traverses the substantially disc-shaped swiveling handle element 12, 112, 212 in a direction substantially perpendicular to the outer surfaces of the handle element 12, 112, 212 at an off-center point of the handle element. As can be seen in FIGS. 3d, 4d and 5d, each of the swiveling handle elements 12, 112, 212 has an end stop 31, so that the position of a pair of handle elements folded into one another is positively defined.

Each of the handle elements 12, 112 shown in FIGS. 3 and 4, and likewise a slide handle 10, 110 formed by these handle elements, has a depression 32, 132 for secure gripping. To illustrate another possibility, the swiveling handle element 212 of FIG. 5 has an ergonomically shaped outside surface.

Particularly preferred is an embodiment of a pair of handle elements as shown in FIG. 3. The rigid handle element 11 in this case has on both sides concave outer surfaces (also see FIG. 1), and the inner surfaces of the recess 14 of the swiveling handle element 12 are shaped to exactly conform to the concave surfaces of the element 11. This facilitates the centering and effortless swiveling of the handle elements 11, 12 into each other. In particular, this embodiment of the two handle elements 11, 12 is self-centering. It is therefore not absolutely required to exactly position the two handle elements 11, 12 vertically above one another in order to combine them into a slide handle 10 by swiveling them into one another. It is sufficient if at least a portion of a handle element 11 is positioned vertically above a portion of a handle element 12.

As is self-evident, handle elements of the foregoing description, forming a pair which can be coupled as a slide handle and at least one of which has to be free to swivel, can also be arranged in the upper part of the balance, for example at the top cover panel and the two side walls, in order to couple the top cover panel and side walls through a mutual engagement so that they will move together. Furthermore, the arrangement of the inventive slide handles is not limited to a balance with a rectangular cross-section.

LIST OF REFERENCE SYMBOLS 1 balance housing
2 weighing compartment
3 rear wall
4 floor of weighing compartment
5 front wall
6 side wall
7 side wall
8 top cover panel
9 grip handle
10, 110, 210 slide handle
11, 111, 211 rigid handle element
12, 112, 212 swiveling handle element
13 foot
14, 114, 214 recess
15 floor compartment
16 holder element
17 guide device
18 guide rail
19 upper guide groove
20 lower guide groove
21 carriage
22 connector body
23 plate
24 housing floor
25 roller
26 projection
27 holder device
28 axle
29 spring
30 fastening lug
31 end stop
32, 132 depression for gripping
33 weighing pan

What is claimed is:

1. A balance comprising a draft shield enclosing a weighing compartment (2) that surrounds a weighing pan (33), wherein the draft shield has at least two slidable walls (6, 7, 8) that are slidable to open and close the weighing compartment (2), wherein said slidable walls include adjoining slidable walls (6, 8 or 7, 8) and non-adjoining slidable walls (6, 7), further comprising a slidable connector body (22) that serves to couple the non-adjoining slidable walls (6, 7), and at least one slide handle (10, 110, 210) configured for coupling and uncoupling at least one of a first connection between two of the adjoining slidable walls (6, 8 or 7, 8) and a second connection between one of the slidable walls (6, 7) and the connector body (22); wherein the at least one slide handle (10, 110, 210) comprises a first handle element (12, 112, 212) and a second handle element (11, 111, 211) complementing each other as a pair, wherein in said first connection the pair of handle elements are connected to the adjoining slidable walls (6, 8 or 7, 8) and in said second connection the pair of handle elements are connected to the connector body (22) and one slidable wall (6, 7), wherein each of the handle elements by itself is configured as a handle to slide the slidable wall (6, 7, 8) or connector body (22) that the handle element is attached to, wherein the first handle element (12, 112, 212) is configured with a recess (14, 114, 214) and the second handle element (11, 111, 211) is configured to engage the recess (14, 114, 214) through a swiveling movement of at least one of the handle elements in order to couple the pair of handle elements together, and wherein a pair of handle elements in their coupled condition as a slide handle (10, 110, 210) has a substantially equal contour shape and size as the first handle element (12, 112, 212).

2. The balance according to claim 1, wherein the recess (14) of the first handle element (12) for receiving the second handle element (11), as well as the second handle element (11), are configured for a self-centering engagement of the second handle element (11) in the first handle element (12).

3. The balance according to claim 1, further comprising a swivel axle (28) which traverses the first handle element (12, 112, 212) at an off-center location of the first handle element, wherein at least the first handle element (12, 112, 212) is configured so that it can be swiveled about the swivel axle (28).

4. The balance according to claim 1, wherein the at least one slide handle (10, 110, 210) and the handle elements (11, 12, 111, 112, 211, 212) that constitute the slide handle are configured substantially in a shape of elongated discs, in particular wing-shaped discs.

5. The balance according to claim 1, wherein the first handle element (12, 112, 212) is configured so that it can snap into two stable positions, wherein one of the two stable positions represents a condition where the pair of handle elements are coupled as a slide handle (10, 110, 210).

6. The balance according to claim 5, further comprising a spring (29), wherein the first handle element (12, 112, 212) is firmly retained in a currently selected one of the two stable positions by means of the spring (29).

7. The balance according to claim 1, wherein the handle elements (11, 12, 111, 112, 211, 212) have outward-facing surfaces with ergonomically shaped depressions (32, 132) to facilitate gripping.

8. The balance according to claim 3, further comprising guide devices (17), one guide device (17) being connected to each of the slidable walls (6, 7) for sliding the slidable walls (6, 7), wherein the second handle element (11, 111, 211) is attached to the guide device (17).

9. The balance according to claim 3, wherein the swivel axle is directly attached to one of the slidable walls (6, 7, 8).

10. The balance according to claim 8, wherein the swivel axle is attached to the guide device (17).

11. The balance according to claim 3, wherein the swivel axle is attached to the connector body (22).

* * * * *